United States Patent Office 3,340,764
Patented Sept. 12, 1967

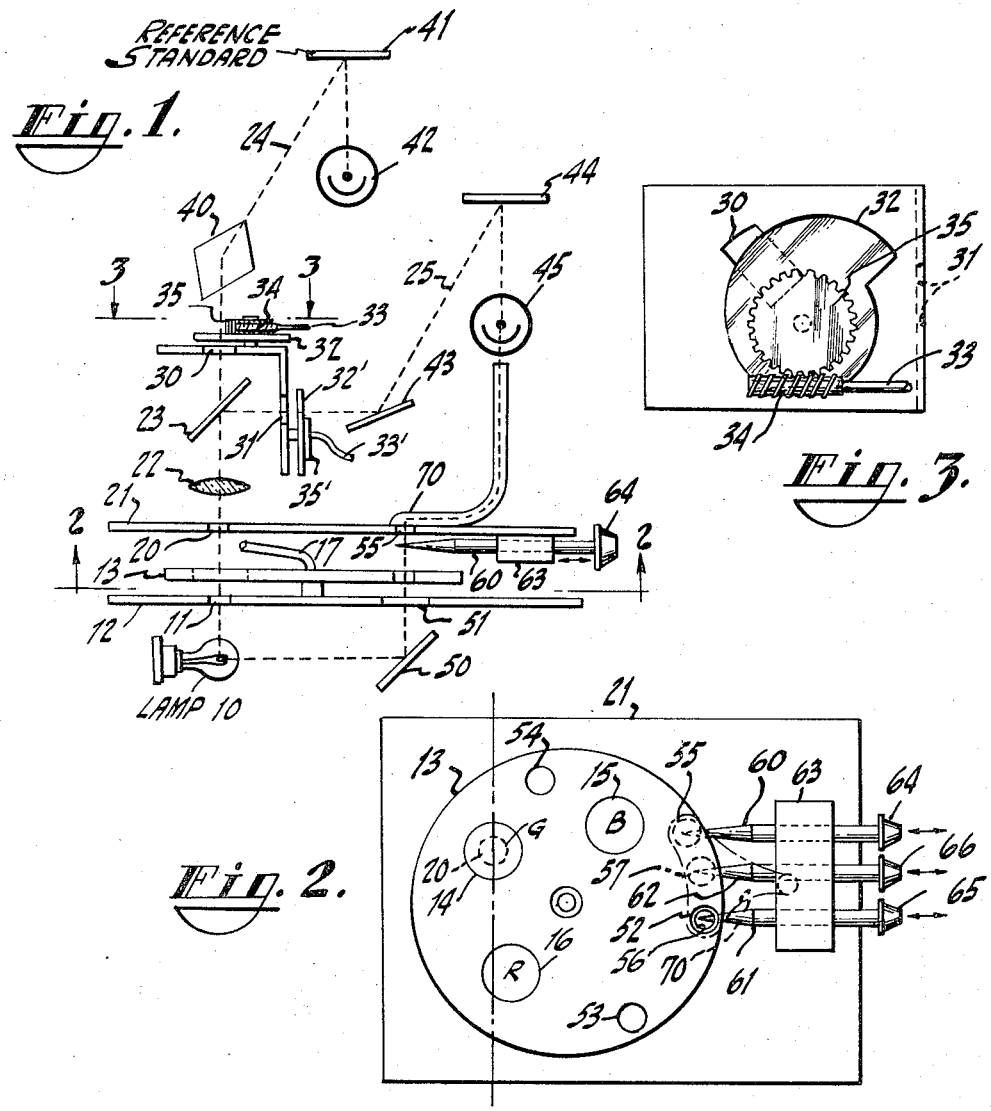

3,340,764
COLOR MEASURING SYSTEM USING A
LIGHT BIASED PHOTOCELL
Gustav Bergson, Jenkintown, Pa. (% Manufacturers Engineering & Equipment Corp., 250 Titus Ave., Warrington, Pa. 18976)
Filed June 24, 1963, Ser. No. 289,900
8 Claims. (Cl. 88—14)

This invention relates generally to light measuring systems, and more particularly to systems for measuring color as a function of the reflectance or transmittance of sets of different spectral components of light directed on a sample of material whose color is to be determined.

In the manufacture of paints, plastics, and other colored or coloring materials it is often desired to maintain the color of the material being manufactured extremely close to a predetermined specification. Colors may be specified by a reference sample of the desired color or by numerical specifications such as the reflectance or transmittance of a predetermined set of spectral components of a light directed on the sample under test.

One type of instrument for measuring color is known as a filter colorimeter. An example of a commercially available filter colorimeter is the Model 3 "Colormaster" manufactured by Manufacturers Engineering and Equipment Corporation, 250 Titus Ave., Warrington, Pa. In this apparatus, light from a suitable source is split into two separate light beams, and directed respectively onto a reference standard color chip, and onto a sample under test. A pair of light responsive means, such as phototubes, are positioned to receive light reflected by or transmitted through the reference standard and the sample under test respectively.

To provide a meaningful measure of color, the reflectance or transmittance characteristics of the sample must be compared with that of a standard for different colors, which may, for example, be red, green and blue. To this end, different filters which pass only the desired spectral distributions, are selectively positioned between the light source and the beam splitter. These distributions, taken in conjunction with the spectral response of the light source and the light responsive means closely approximates the desired red, green and blue colors to be reflected. In addition, a pair of variable apertures are provided, one in the path of each of the two light beams. One of the variable apertures, referred to as a zeroing aperture, is used in setting up the scale of the apparatus, and the control for the other aperture is coupled to an indicating means which is calibrated to read in terms of percent reflectance or transmittance. As used hereinafter, the term reflectance will be understood to include transmittance.

In setting up the apparatus for operation, a first reference standard color chip generally white, is placed in the path of one light beam and a second calibrated standard sample color chip, also generally white, is placed in the path of the other light beam. With one of the filters, such as the green filter, in the common light beam path, the indicating means is set to indicate the known green reflectance of the second standard sample. In the latter step, the variable aperture in the path of the light beam to the first reference standard is automatically adjusted. The variable zeroing aperture in the light beam to the second calibrated standard sample is then adjusted to equalize the response from the light responsive means which receives light reflected from the reference standard and the standard sample respectively. Next, the green filter is removed, and a blue filter is positioned in the common light beam path. The indicating means is then set to indicate the known blue reflectance of the second standard sample, and circuitry associated with the light responsive means is adjusted to provide equality of response therefrom. In similar manner with the red filter in the common light beam path, the indicating means is set to indicate the known red reflectance of the second standard sample, and additional circuitry associated with the light responsive means is adjusted to provide equality of response therefrom.

To provide a tracking adjustment which permits accurate measurement over a wide range of reflectances, the second standard sample is replaced by a third low reflectance standard sample. With the third standard in position, the variable aperture in the path of the light beam to the first standard is adjusted until light through that aperture causes an equality of response from the light responsive means. The indicating means is then decoupled from this variable aperture and set to read the known low-reflectance of the third standard sample for the particular color of the filter then in path of the light beam, and then recoupled to the variable aperture. After the foregoing adjustments have been made, the third standard sample is replaced by a sample whose color is to be determined.

Since the alignment of the prior apparatus for low reflectance measurements is effected for only one color, differences in the transmission characteristics of the filters and in the spectral responses of the light responsive means cause misalignment of the apparatus for the other two colors, so that no accurate correlation exists between the responses of the light sensitive means and the indicating means for the other two colors. In addition, differences in the dark currents of the light sensitive means adversely affects low reflectance measurements of prior colorimeters, and accordingly, a great deal of care is required in the selection of phototubes used therein, since the dark currents are not easily matched for very low reflectance measurements. Even with great care in the matching of the phototubes, the low reflectance readings of colorimeters have not been reliably accurate. One reason for this is that with only a very small amount of light, a phototube operates in a relatively insensitive and non-linear portion of its characteristic. Another reason is that the adjustable aperture in the path of the light beam to the first standard is barely open giving rise to undesirable edge effects.

Accordingly it is an object of this invention to provide an improved colorimeter.

Another object of this invention is to provide an improved apparatus for measuring low reflectance or transmittance of light for any of a pluarlity of colors in a positive and accurate manner.

A further object of this invention is to provide an improved measuring apparatus for reliably determining the reflectance from any of three predetermined colors down to a few hundredths of a percent reflectance.

A still further object of this invention is to provide an improved colorimeter in which the problem of matching phototubes is greatly reduced as compared to known apparatus.

Another object of this invention is to provide an improved colorimeter which provides highly accurate indication of reflectance or transmittance of any of a plurality of colors over a wider range of reflectance values than known colorimeters.

In accordance with the invention, a colorimeter of the general type described includes an auxiliary light path from the light source to the light responsive means associated with the test sample. Light through the auxiliary path is passed through an adjustable aperture corresponding to one of the filters selectively positioned in the main light paths to the reference standard and to the test sample. The light transmitted through the auxiliary path provides a light or radiant energy bias on the light responsive means associated with the test sample so that for very low reflectances both light responsive means operate in a substantially linear and more sensitive portion of their characteristics. The auxiliary light path preferably comprises light conduit means, such as a light conveying lucite tube, to avoid undesired reflectances and interference in the apparatus.

In a preferred form of the invention, a plurality of auxiliary light paths are provided, each including an adjustable aperture. Only one of the auxiliary light paths is used at a time: i.e. when a green filter is in the main light path, a first auxiliary light path with its adjustable aperture is used; when a blue filter is in the main light path, a second auxiliary light path with its adjustable aperture is used; etc. This feature permits accurate adjustment of the colorimeter for the measurement of low reflectance readings of any of the colors.

The novel features which are considered to be characteristic of this invention are set forth with particularity in the appended claims. The invention itself, however, both as to its organization and method of operation, together with additional objects and advantages thereof will best be understood from the following description when read in connection with accompanying drawings in which:

FIGURE 1 is a schematic illustration of a colorimeter embodying the invention;

FIGURE 2 is a sectional view taken on section lines 2—2 of FIGURE 1;

FIGURE 3 is a sectional view taken on section lines of FIGURE 1; and

FIGURE 4 is a schematic circuit diagram of a metering circuit useful in connection with the colorimeter shown in FIGURES 1–3.

Referring now to the drawings wherein like reference numerals will be used to indicate the same component in the various figures, FIGURE 1 represents schematically, in plan view, a colorimeter which is generally similar to the "Colormaster" Model 3 noted above, but modified in accordance with the invention.

The colorimeter includes a suitable lamp 10 which is positioned to direct light through a first aperture 11 in a light shield 12. A filter wheel 13 is rotatably mounted on the opposite side of the light shield 12 from the lamp 10. As shown in FIGURE 2, the filter wheel 13 has three major apertures, each supporting a filter which yields a quite definite spectral transmission in different limited portions of the spectrum of light from the lamp 10. In the present instance the filter 14 passes green light, the filter 15 blue light, and the filter 16 red light. The filter wheel 13 is connected by a flexible cable 17 to a front panel control, not shown. The mechanism for rotating the filter wheel is suitably detented to provide four definite stop positions. In three of the positions different ones of the filters 14, 15 or 16 are brought into registry with the aperture 11 in the light shield 12. The fourth position is an off position.

Filtered light from the filter wheel 13 is then directed through an aperture 20 in a second light shield 21 to a condensing lens system represented at 22. From the lens system 22, the light is directed to a beam splitter 23 which splits the light into two separate beams 24 and 25.

The light beam 24 is passed through a variable aperture which is best shown in FIGURE 3. As a practical matter, the lens system 22 and the beam splitter 23 are mounted in a common enclosure which has a pair of shaped apertures 30 and 31 in adjacent walls thereof for the light beams 24 and 25 respectively. A cam 32 which may be considered to be in the shape of a spiral of Archimedes, variably blocks the aperture 30 to provide in effect a variable aperture or light gate. The cam 32 is rotatably mounted on the enclosure for the beam splitter 23 and lens system 22, in a manner that the aperature can be completely closed.

A front panel control, not shown, is coupled through a flexible cable 33 to a worm gear 34, which drives a gear 35 mounted on the cam 32. The front panel control is calibrated to provide an indicating means, which provides readings in terms of reflectance units. Preferably the front panel control is coupled to a counter indicating means of the type described in United States Patent 2,763,161, issued on Sept. 18, 1956, to Gustav Bergson.

The variable aperture 30 controls the amount of filtered light passed to the mirror 40, which light is reflected to a reference or reference standard 41. The light reflected from the reference standard 41 is directed on light sensitive means shown as a phototube 42. The light beam 24 is directed onto the reference standard 41 at an angle of 45° and is viewed by the phototube 42 at an angle of zero degrees to the normal.

The light beam 25 is directed through the variable aperture 31 which will be referred to as the zeroing aperture. The zeroing aperture 31 which may be similar in construction to that shown in FIGURE 3, includes a rotatable cam 32′, a gear 35′, a worm gear 34′ and a flexible cable 33′. In the Model 3 "Colormaster" referenced above, the aperture 31 configuration is circular. The flexible cable 33′ is coupled to a front panel control, not shown.

From the zeroing aperture 31, the light beam 25 is directed onto a mirror 43 from which it is reflected at an angle of 45° to a sample 44 under test. Light reflections from the sample 44 are viewed by a phototube 45 at an angle of zero degrees to normal.

The portion of the colorimeter described thus far is in general similar to those presently available. It will be understood that the various components are contained in a light-proof cabinet with non-reflective inner walls, and suitable internal shielding to isolate the light beams 24 and 25.

In order to improve the accuracy and reliability of low reflectance color measurements as well as to reduce the criticality of the phototube characteristics, an auxiliary controlled biasing light path is provided to the phototube 45. Light from the lamp 10 is directed onto a mirror 50 which is positioned to reflect the light through a second aperture 51 in the light shield 12. The light is then directed through an auxiliary aperture 52 in the filter wheel 13. The auxiliary aperture 52 is associated with the green filter 14. In addition auxiliary apertures 53 and 54 in the filter wheel 13 are associated respectively with the blue filter 15 and the red filter 16.

The light shield 21 has three apertures 55, 56 and 57 each positioned for registry with one of the auxiliary apertures on the filter wheel 13. When the main green filter 14 is in registry with the aperture 11, the associated auxiliary aperture 52 is in registry with the aperture 56 as is shown, and no light passes through the apertures 55 and 57. In like manner, when the main blue filter 15 is in registry with the aperture 11, the associated auxiliary aperture 53 is in registry with the aperture 55, and no light passes through the apertures 56 and 57. Similarly when the apparatus is set to the red filter position, the main red filter 16 is in registry with the aperture 11 and the associated auxiliary aperture 54 registers with the aperture 57. The second aperture 51 in the light shield 12 is of sufficient vertical dimension to pass light to any of the three possible auxiliary aperture positions.

The amount of light which passes through any of the apertures 55, 56 and 57 is controlled by adjustable light blocking members 60, 61 and 62 which are separately threaded into a mounting block 63. The light blocking members 60, 61 and 62 may be adjusted in any suitable manner such as by knobs 64, 65 and 66 which extend exteriorly of the apparatus casing. By way of example when one of the knobs, such as the knob 64, is rotated, the light blocking member 60 is moved axially to cover more or less of the blue associated aperture 55 and hence control the amount of light passing therethrough.

Light conduit means 70 is provided to cover the apertures 55, 56 and 57 on the opposite side of the light shield 21 from the filter wheel 13. The light conduit which may comprise a suitably formed piece of lucite, picks up any light passing through the apertures 55, 56 or 57 and conveys this light to the phototube 45. If desired, the light conduit 70 may be formed in two or more sections to facilitate the forming of the conduit or to facilitate the design and assembly of a particular apparatus. The type of light conduit described provides the particular advantage of minimizing spurious light reflections and interference in the equipment.

An example of the circuitry associated with the phototubes 42 and 45 is shown in the schematic circuit diagram of FIGURE 4. The phototubes 42 and 45 are connected in series across a source of operating potential shown as a battery 80. A pair of switches 81 and 82 are provided for selectively connecting in circuit across the phototubes any one of three resistors 83, 84 and 85 each having an adjustable grounded tap. The adjustable taps are controlled by front panel knobs, not shown, and are used in the alignment of the colorimeter as will be described.

The junction of the phototubes is connected through a switch 86 to the grid of a triode tube 87. The cathode of the tube 87 is connected to ground through a resistor 88 having a movable tap. A second triode tube 89 has a grid connected to ground, and a cathode connected through a resistor 90 to ground. The anodes of the tubes 87 and 89 are connected in common to an operating potential supply source shown as a battery 91.

The tubes 87 and 89 are connected as a differential amplifier. With the switch 86 set to position a, the grids of both tubes are grounded, and the balance of the differential amplifier is indicated by a meter 92 connected between the cathode of the tube 89 and the tap on the resistor 88. The amplifier may be balanced by adjusting the tap on the resistor 88 until the meter 92 reads zero. The b and c positions of the switch 86 are the low and high meter sensitivity positions respectively for determining the balance of the phototubes.

To align the apparatus for operation, it is desirable to first establish the settings of the adjustable light blocking members 60, 61 and 62 which are controlled respectively by the knobs 64, 65 and 66. This adjustment is effected by positioning the reference standard 41 in the path of the light beam 24 as shown in FIGURE 1, and by inserting a non-reflective light block, not shown, in the path of the light beam 25 so that substantially no light from the beam 25 reaches the phototube 45. By way of example, the light block may comprise a sheet of black, opaque rubber. The indicating means and the variable aperture 30 are then adjusted so that the amount of light reaching the phototube 42 is sufficiently great to cause the phototube 42 to operate in a substantially linear portion of its operating characteristic. It has been determined that an amount of light corresponding to a reflectance of the order of 5% is sufficient to operate the phototube in a relatively high sensitivity portion of its operating characteristic. However the amount of light reaching the phototube 42 through the variable aperture 30 must be within a range corresponding to the amount of light reaching the phototube 45 by way of the light conduit 70 to permit balancing of the phototube responses.

With the filter wheel 13 in the green position, i.e. light is passing through the green filter 14 and the auxiliary aperture 52, the knob 65 is adjusted to control the amount of light admitted through the aperture 56 until the response of the two phototubes 42 and 45 are balanced as indicated by a zero reading of the meter 92.

With the filter wheel in the blue position, the knob 64 is adjusted to control the light blocking member 60, and the amount of light through the auxiliary blue aperture 53 which reaches the phototube 45. When the meter 92 reades zero, the filter wheel 13 is moved to its red position, and the knob 66 is adjusted until the meter 92 reads zero. The indicating means is then mechanically declutched from the cable 33 and set to read zero, after which it is mechanically recoupled to the cable 33.

With this preliminary setting of the "floating optical zero," the light block is removed from the path of the light beam 25, and a high reflectance standard sample having known spectral reflectance characteristics usually closely matching those of the reference standard 41 is positioned in the place of the sample 44. The front panel control knob controlling the filter wheel 13 is arbitrarily set to one of the color positions such as green, to bring the main green filter into alignment with the aperture 11, and the associated auxiliary aperture 52 into alignment with the aperture 56. The same knob that controls the filter wheel is ganged to the switches 81 and 82 (FIGURE 4) to connect the resistor 83 in circuit across the phototubes 42 and 45.

The front panel knob which controls the cam 32 for the aperture 30 is then adjusted until the indicating means associated therewith indicates the known green reflectance of the standard sample. The light reflectances from the two samples onto the respective phototubes 42 and 45 is then balanced by moving the tap on the resistor 83 approximately to its center position, and adjusting the zeroing cam 32′ until the meter 92 reads zero. If necessary the tap on the resistor 83 can be used to provide a fine adjustment.

In the next adjustment step, the filter wheel is moved to a second position bringing the blue filter 15 into alignment with the aperture 11, and simultaneously actuating the switches 81 and 82 to connect the resistor 84 in circuit across the phototubes 42 and 45. The control for the cam 32 and indicating means, not shown, is then adjusted to indicate the known blue reflectance of the second standard. The tap on the resistor 84 is then moved until the meter 92 indicates zero. With the red filter 16 aligned with the aperture 11 and the switches 81 and 82 connecting the resistor 85 in circuit with the phototubes, the indicating means, not shown, is set to indicate the known red reflectance of the standard sample, and the meter 92 is set to read zero by adjusting the grounded tap on the resistor 85.

At this point, the non-reflective light block, not shown, is reinserted in the path of the light beam 25 to reestablish an effective condition of zero reflectance. The front panel knob which controls the cam 32 is then moved so that the indicating means associated therewith indicates zero reflectance. The filter wheel 13 is turned to the green filter position, and any slight readjustment as may be required for balancing the response of the phototubes 42 and 45 is now made by adjustment of the knob 65. As noted above, the balance of response of the phototubes is indicated by a zero reading of the meter 92. The same procedure is followed with the filter wheel 13 in the blue and red positions and with adjustment of knobs 64 and 66 respectively. The instrument is now set for operation at the zero reflectance end.

The non-reflective light block is now removed from the path of the light beam 25 and a check is made of the balance of the green, red and blue readings of the standard sample. Any slight readjustments as required to obtain final balance in the high reflectance end of measurements are made in the same manner as that employed in establishing the original high reflectance settings, except that the adjustment of the zeroing aperture is not altered, and the balance of the phototubes 42 and 45 in the green filter position is effected by adjusting the tap on the resistor 83. The instrument is then ready for operation.

When the colorimeter has been calibrated as described above, color measurements may be taken of a sample of unknown color. As in prior apparatus, measurements are taken for each of the three filter wheel positions by adjusting the cam 32 until the meter 92 reads zero. The reflectance of the sample for each color may then be determined by observing the different setting of the indicating means coupled to the cam 32. The colorimeter provides highly accurate reflectance measurements of both relatively high and relatively low reflectance colors. Reliable and accurate measurements can be taken for reflectance down to a few hundredths of a percent reflectance.

The improved reliability and accuracy in the measurement of low reflectances is due in part to the fact that at zero measured reflectance, sufficient light is admitted to both phototubes so that they are operating on a linear and more sensitive portion of their operating characteristics as compared to the situation where substantially no light is available to activate the tubes. In prior apparatus, when very low reflectance measurements were being made, the cam 32 nearly closed the aperture 30 so that very little light reached either of the phototubes. In such a case: (1) edge effects were produced with the light passing over the cam 32; (2) the phototubes 42 and 45 were operated in a non-linear and insensitive portion of their characteristics; (3) since known colorimeters are aligned for low reflectance measurements for only one of the three colors, differences in the light transmission characteristics of the filters and in the spectral responses of the phototubes cause misalignment for the other two colors; and (4) the dark currents of the phototubes had to be matched, requiring careful selection of the phototubes used in a given colorimeter. These disadvantages which detrimentally affected the accuracy of low reflectance measurements in prior colorimeters have been obviated in colorimeters embodying the "floating optical zero" of the present invention.

The "floating optical bias" provided by the auxiliary light path to the phototube 45: (1) eliminates edge effects since the cam 32 is opened wide enough, even for zero reflectance measurements, to pass sufficient light that any action due to edge effect is insignificant; (2) provides sufficient light to both phototubes, even for zero reflectance measurements, to operate these tubes in a much more sensitive and linear portion of their operating characteristics; (3) provides three independently adjustable auxiliary light paths to permit low reflectance alignment for all of the colors; and (4) places less rigorous requirements on the matching of the phototubes. The net result is the provision of an improved colorimeter capable of providing reliable and accurate reflectance measurements down to values of a few hundredths of a percent reflectance.

It will be understood that the apparatus shown and described is susceptible of modification without departing from the scope of the invention. For example, if desired, only one auxiliary light path can be provided, not necessarily passing through the filter wheel 13. Although such a modification provides the advantages of minimizing edge effects, linear phototube operation, and flexibility in phototube selection, the advantages of separate alignment for the different colors are sacrificed.

Having described my invention, what is claimed is:

1. The combination with reflectance or transmittance measuring apparatus of the type having a source of radiant energy, means for directing radiant energy from said source along a pair of separate paths to a reference standard material and to a sample, an adjustable aperture in one of said paths, first radiant energy responsive means positioned to receive radiant energy from said reference standard, and second radiant energy responsive means positioned to receive radiant energy from said sample; of means for directing an auxiliary adjustable and, in comparison with the radiant energy along the path to said sample, small amount of radiant energy from said source to that one of said radiant energy responsive means receiving radiant energy from said sample to provide a light bias therefor.

2. The combination with reflectance or transmittance measuring apparatus of the type having a source of radiant energy, means for directing radiant energy from said source along a pair of separate paths to a reference standard material and to a sample, an adjustable aperture in said path which includes the reference standard, first radiant energy responsive means positioned to receive radiant energy from said reference standard, and second radiant energy responsive means positioned to receive radiant energy from said sample; of means for directing an auxiliary adjustable and, in comparison with the radiant energy along the path to said sample, small amount of radiant energy from said source to that one of said radiant energy responsive means receiving radiant energy from said sample to provide a light bias therefor.

3. In a colorimeter of the type having a source of light; a plurality of filters for passing different spectral distributions of light from said source, means for selectively positioning said filters in the path of light from said source; means for directing in separate paths, light passing through the filter positioned in the path of light from said source onto a reference standard and onto a sample to be measured; first photo responsive means positioned to receive light from said reference sample; and second photo responsive means positioned to receive light from said sample to be measured; an additional plurality of paths along which radiant energy can pass to said second photo-responsive means, the radiant energy passing along any one of said additional plurality of paths being small in comparison with the radiant energy passing along the path to the sample to provide a light bias therefor, with means for blocking the light along all but one of the additional plurality of paths, and means for varying the intensity of the radiant energy along the additional plurality of paths.

4. In a colorimeter of the type defined by claim 3, means for independently controlling the amount of light passed through each of said additional light paths.

5. In a colorimeter of the type defined by claim 3, wherein a common means selectively positions one of said filters in the path of light from said source and said blocking means in all but one of the said additional paths of light.

6. In a colorimeter of the type having a source of light; means for forming light from said source into a light beam; a rotatable carrier member; a red filter; a green filter, a blue filter; said red, green and blue filters being positioned in spaced relation on said rotatable carrier member; means for rotating said carrier member to position a selected one of said filters in the path of said light beam; a beam splitter positioned to receive said light beam after passing through one of said filters, said beam splitter dividing said light beam into first and second separate paths, an adjustable aperture positioned in the first of said paths; means for passing light through said adjustable aperture onto a reference material of relatively high reflectance; a standardizing aperture positioned in the second of said paths of said light beam; means for passing light through said standardizing aperture onto a sample to be measured; a first phototube positioned to receive light reflected from said reference material; a second phototube positioned to receive light reflected from said sample; and means for comparing the relative responses of said phototubes; the combination comprising additionally, auxiliary means for passing light from said source along a third path onto said rotatable carrier at a position removed from the impingement of said light beam on said carrier; first, second and third spaced apertures on said carrier; a light shield having first, second and third apertures; said third light path, rotatable carrier and light shield being so arranged that the first aperture in said carrier and said shield are aligned to pass light when said green filter is in the path of said light beam, the second apertures in said carrier and shield are aligned to pass light when said blue filter is in the path of said light beam, and the third apertures in said carrier and shield are aligned when said red filter is in the path of said light beam; means providing a separate light attenuating member for each of said apertures in said light shield to individually control the amount of light which passes through said apertures; light conduit means positioned to receive and convey light passing through aligned apertures in said carrier and shield to said second phototube.

7. In a colorimeter of the type having a source of light; a plurality of filters for passing different spectral distributions of light from said source, means for selectively positioning said filters in the path of light from said source; means for passing said light through the filter positioned in its path and separately onto a reference standard and a sample to be measured; first photo responsive means positioned to receive light from said reference sample; and second photo responsive means positioned to receive light from said sample to be measured; the combination including means providing a plurality of additional light paths each associated with a different one of said filters, means for selectively positioning a desired one of said filters in the path of light from said source and for simultaneously passing a much smaller amount of light along one of said plurality of additional light paths between said light source and said second photo responsive means to provide a light bias therefor, and means for adjusting independently the light transmission efficiency of any of said additional light paths.

8. In apparatus of the type having a source of radiant energy; means for forming radiant energy from said source into a beam; a rotatable carrier member; a first filter; a second filter; a third filter; each of said filters adapted to pass different spectral distributions of radiant energy from said source and positioned in spaced relation on said rotatable carrier member; means for rotating said carrier member to position a selected one of said filters in the path of said beam; a beam splitter positioned to receive said beam after passing through one of said filters, said beam splitter passing said beam along first and second separate paths; an adjustable aperture positioned in the first path of said beam; means for passing radiant energy through said adjustable aperture onto a reference standard; means for passing radiant energy in said second path onto a sample to be measured; a first radiant energy responsive means positioned to receive radiant energy from said reference standard; a second radiant energy responsive means positioned to receive radiant energy from said sample; and means for comparing the relative responses of said radiant energy responsive means; with additional means for passing radiant energy from said source in auxiliary paths onto said rotatable carrier at a position removed from the impingement of said beam on said carrier; first, second and third spaced auxiliary apertures on said carrier; a shield having first, second and third apertures; said auxiliary radiant energy paths, rotatable carrier and shield being so arranged that the first auxiliary apertures in said carrier and said shield are aligned to pass radiant energy when said first filter is in the path of said beam, the second auxiliary apertures in said carrier and shield are aligned to pass light when said second filter is in the path of said beam, and the third auxiliary apertures in said carrier and shield are aligned when said third filter is in the path of said beam; means providing separate adjustable attenuating members for each of said auxiliary apertures in said shield to individually control the amount of radiant energy which passes through said auxiliary apertures; conduit means positioned to receive and convey radiant energy passing through aligned apertures in said carriers and shield to said second radiant energy responsive means.

References Cited

UNITED STATES PATENTS

| | | | |
|---|---|---|---|
| 2,678,725 | 5/1954 | Jacobson | 88—14 |
| 2,774,276 | 12/1956 | Glasser et al. | 88—14 |
| 2,780,155 | 2/1957 | Debrie | 88—111 |

JEWELL H. PEDERSEN, *Primary Examiner.*

D. R. STEVENS, W. A. SKLAR, *Assistant Examiners.*